United States Patent [19]

Maud et al.

[11] Patent Number: 4,954,840
[45] Date of Patent: Sep. 4, 1990

[54] AUTOMATIC TICKET DISPENSER

[75] Inventors: John R. Maud; Allan S. Cooper, both of Pietermaritzburg, South Africa

[73] Assignee: Latilla Holdings (Guernsey) Limited, Guernsey, Channel Islands

[21] Appl. No.: 468,916

[22] Filed: Jan. 23, 1990

Related U.S. Application Data

[63] Continuation-in-part of Ser. No. 7,236,644, Aug. 25, 1988, Pat. No. 4,931,884.

[30] Foreign Application Priority Data

Aug. 27, 1987 [ZA] South Africa .................... 87/6389

[51] Int. Cl.$^5$ .................. G01D 15/20; G06K 15/00
[52] U.S. Cl. .................................. 346/93; 235/378; 194/902; 364/467; 368/90
[58] Field of Search ............... 346/93, 78, 79, 80, 346/81, 89; 340/51; 235/378; 368/90; 194/900, 902; 364/479, 467

[56] References Cited

U.S. PATENT DOCUMENTS

| | | | |
|---|---|---|---|
| 2,795,875 | 6/1957 | Nutter | 340/51 |
| 3,541,308 | 11/1970 | Ruby | 235/378 |
| 4,720,785 | 1/1988 | Shapiro | 235/378 |

*Primary Examiner*—Bruce A. Reynolds
*Assistant Examiner*—Scott A. Rogers
*Attorney, Agent, or Firm*—Darby & Darby

[57] ABSTRACT

An automatic ticket dispenser of the type which prints onto a ticket, as or before it is dispensed, information including that as to time and date is provided. The ticket dispenser employs an electronic time clock advantageously with a battery back-up power supply and an electronic print head such as a dot matrix print head in the path of movement of tickets being dispensed. The ticket dispenser is of a type which is particularly suitable for use at entrances to parking areas and the like.

13 Claims, 3 Drawing Sheets

AUTOMATIC TICKET DISPENSER

RELATED APPLICATIONS

This application is a continuation-in-part application to U.S. Application Ser. No. 236,644 filed Aug. 25, 1988, allowed U.S. Pat. No. 4931884.

FIELD OF THE INVENTION

This invention relates to automatic ticket dispensers and, more particularly, to automatic ticket dispensers wherein a ticket being dispensed is required to have certain prevailing information, in particular the time and date, printed on the ticket at the time when it is dispensed.

Such ticket dispensers are widely used at entrances to parking garages or parking lots to automatically issue parking tickets to casual customers upon arrival. The ticket thus dispensed, which carries information as to the time and date, is used, upon departure, for the automatic or manual calculation of a fee to be paid according to the time that has elapsed between when the ticket was dispensed and when payment is made. Such dispensers are often used in combination with an automatic barrier which is opened once a ticket has been removed from the dispenser.

BACKGROUND TO THE INVENTION

As far as applicant is aware, automatic ticket dispensers employ electro-mechanical means for stamping the current date and time onto a ticket at the time when it is dispensed. Such am arrangement generally consists of a one-revolution per minute synchronous motor coupled to mechanically advanced numbered print wheels which are suitably cogged together to advance by one position every minute, with the minute wheel advancing the tens of minutes wheel in known manner.

When a ticket is issued by such an apparatus a rubber stamp pad is raised beneath the ticket and synchronous motor assembly (herein referred to as a clock mechanism) and the raised numbers on the numbered wheels are imprinted on the ticket through an inked ribbon.

This arrangement has a number of disadvantages not the least of which is the fact that such a clock mechanism is susceptible to variations in the frequency of the mains supply and also must be reset each time after a power failure and at each month end. This ignores interim settings which may be necessary due to the inherently poor time keeping characteristics associated with such a clock.

In addition, and as a result of the complex mechanical nature of the "clock mechanism", dust, dirt, and fluff from the tickets tends to accummulate and cause erratic operation and necessitating frequent service calls and preventive maintenance. Also, after an extended period of operation, the cogs and ratchet mechanism of the clock mechanism are subject to wear and eventually begin to skip movements thereby resulting in incorrect time recordals on the tickets.

Furthermore, due to the complex electro-mechanical assembly of parts, servicing and repair is complicated, tedious, and accordingly, costly.

Other difficulties that arise are the exact positioning of a ticket being dispensed relative to a guillotine for severing a single ticket from a substantially continuous chain of tickets. The reason for this is that the tickets are stored in substantially continuous form but with a series of spaced transverse perforated lines for enabling the tickets to be stored in a stacked, folded, concertina configuration. If the guillotine attempts to sever a ticket in the immediate vicinity of a perforated line, cutting can be ineffective and the guillotine may jam.

It is the object of this invention to provide a ticket dispenser of the aforegoing general type but wherein the disadvantages outlined are, at least to some extent, alleviated.

SUMMARY OF THE INVENTION

In accordance with this invention there is provided an automatic ticket dispenser comprising ticket feed means including a rotatable sprocket drum co-operant with prepunched holes in a substantially continuous chain of tickets for dispensing tickets in a path, a print head assembly in the path of movement of tickets dispensed by the dispenser, a time clock, control circuitry connected to the time clock and print head, and a sensor co-operant with formations on the sprocket drum to control the ticket feed means through the control circuitry, the arrangement being operative to print required information concerning time, as reflected by the time clock, onto a leading ticket of a chain thereof as it is dispensed through the feed means by the sprocket drum, and wherein rotation of the sprocket drum is controlled by the control circuitry in co-operation with the sensor.

Further features of the invention provide for the print head to be an electronic print head, in particular a dot matrix print head; for the sprocket drum to be operated by a stepper motor through a worm gear drive; for the ticket dispenser to embody a guillotine for separating individual tickets from the chain thereof after printing and movement thereof by the sprocket drum to a dispensing position; for the sensor to be an optical sensor co-operating with notches or holes in the sprocket drum; and for a ticket counter to be included for recording the number of tickets dispensed during any required time period.

Preferably, the sensor detects a formation on the drum during the movement thereof and the control circuitry operates to terminate movement of the sprocket drum only after a predetermined movement of the drum has taken place subsequent to such detection. This enables said predetermined movement to be rendered adjustable to adjust the position of a transverse perforated line across a chain of tickets relative to the position of a guillotine.

It is also a feature of this invention that the individual units, such as the guillotine, print head, ribbon for a print head (if such be required), drive motor or the like be assembled on a substantially modular basis to enable quick and simple replacement of the modules to be achieved thereby enabling complex or high-tech repairs to be carried out at a central repair shop which can be fully equipped for such purposes. Such nr arrangement minimises service call time for any one ticket dispenser. The same principle applies to the electronic control circuitry which is preferably arranged on a series of plug-in type of circuit boards to render replacement extremely swift and simple.

In order that the invention may be more fully understood, one embodiment thereof will now be described with reference to the accompanying drawings.

DETAILED DESCRIPTION WITH REFERENCE TO THE DRAWINGS

Figure 1:
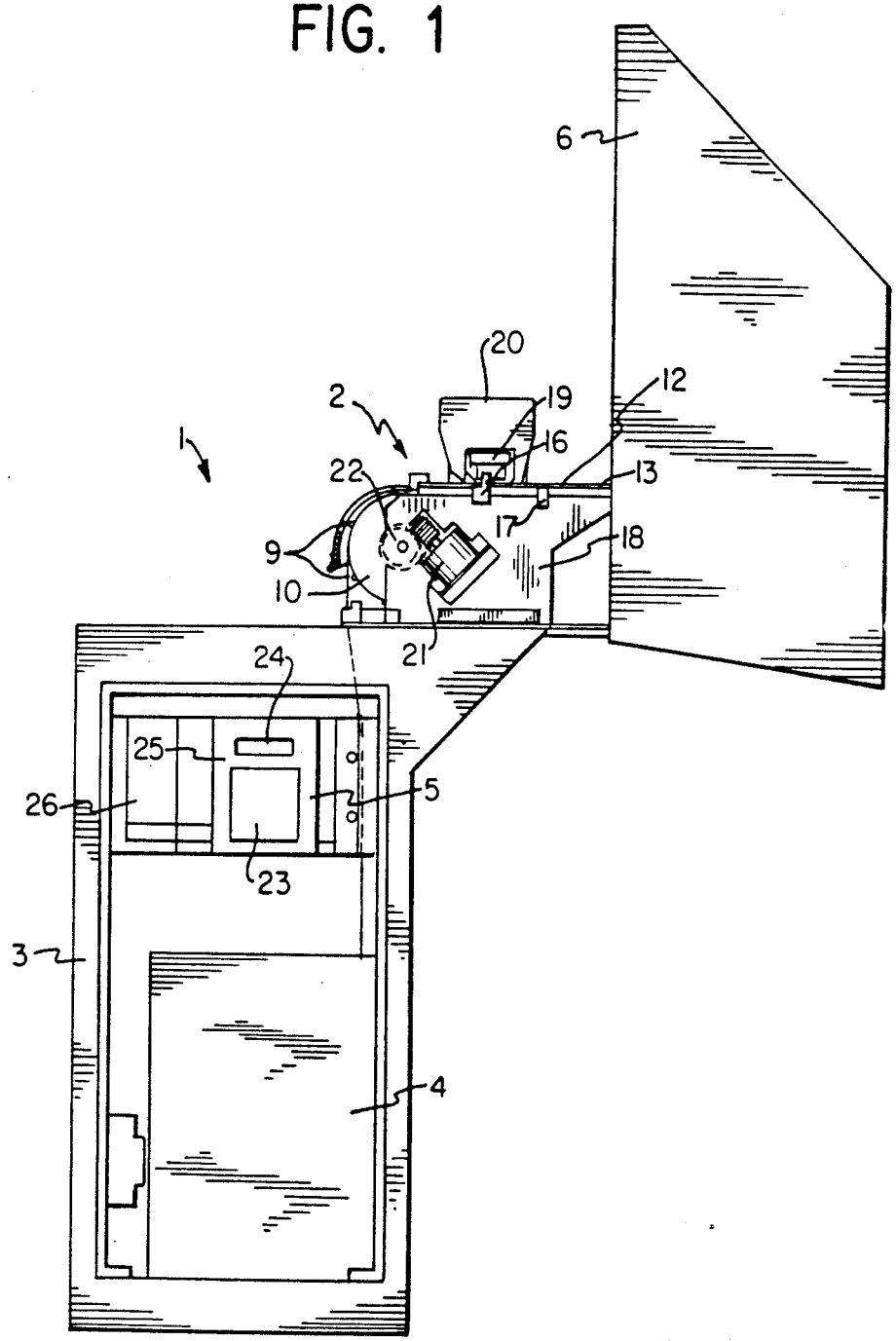
FIG. 1 is a schematic side elevation of a ticket dispenser according to the invention with the cover in the open position.
Figure 2:
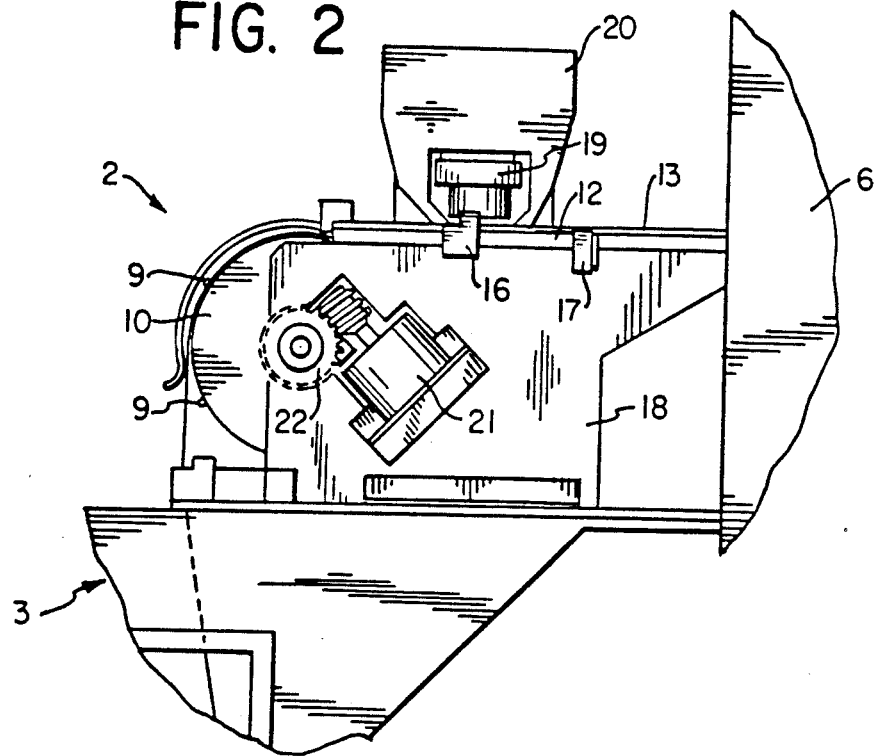
FIG. 2 is simply an enlargement of the ticket dispensing head of the dispenser.

In this embodiment of the invention an automatic ticket dispenser, generally indicated by numeral 1, has a ticket dispensing head 2 carried at the upper end of a pedestal base 3 which forms a housing for a ticket storage tray 4 and electronic control circuitry 5 for the ticket dispenser. The ticket dispenser head 2 has a cover 6 which can be tilted to an open position as illustrated, or to a closed position, in known manner.

Figure 4:
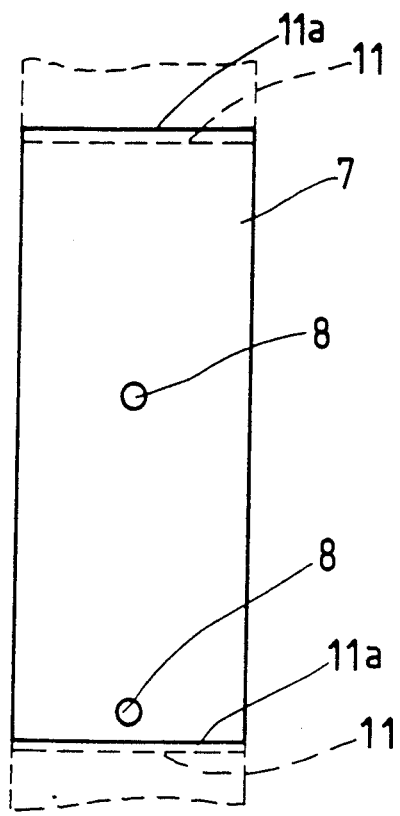
FIG. 4 is a plan view of a ticket dispensed by the ticket dispenser.
Figure 5:
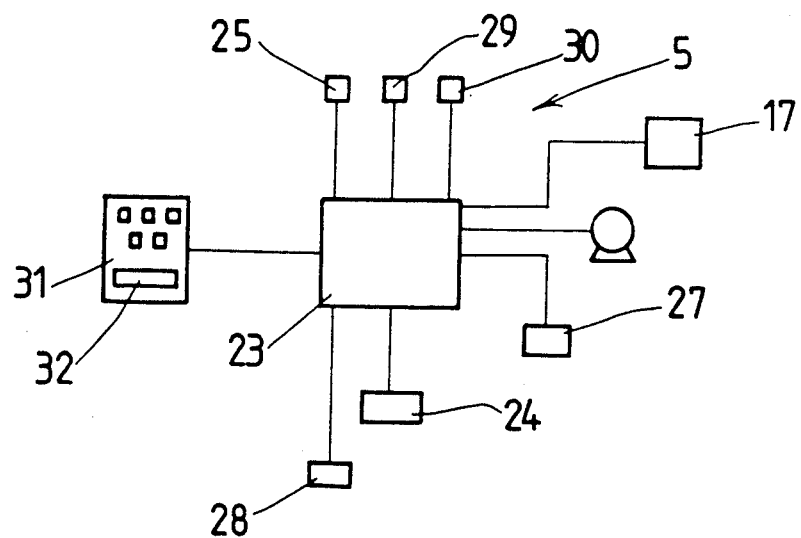
FIG. 5 is a block diagram of the control circuitry of the ticket dispenser.

The ticket dispenser is adapted to dispense tickets 7 stored in a substantially continuous and folded chain thereof and which are prepunched with holes 8 co-operating with the sprockets 9 of a sprocket drum 10 forming part of the ticket feed means of the dispenser head. The folds in the chain of tickets are effected at transverse lines 11 of perforations, thereby enabling the continuous chain of tickets to be stacked in concertina type of configuration in known manner. The ends 11a of the finally cut tickets are somewhat offset from the lines of perforations as will become more apparent from the following (see FIG. 4).

Figure 3:
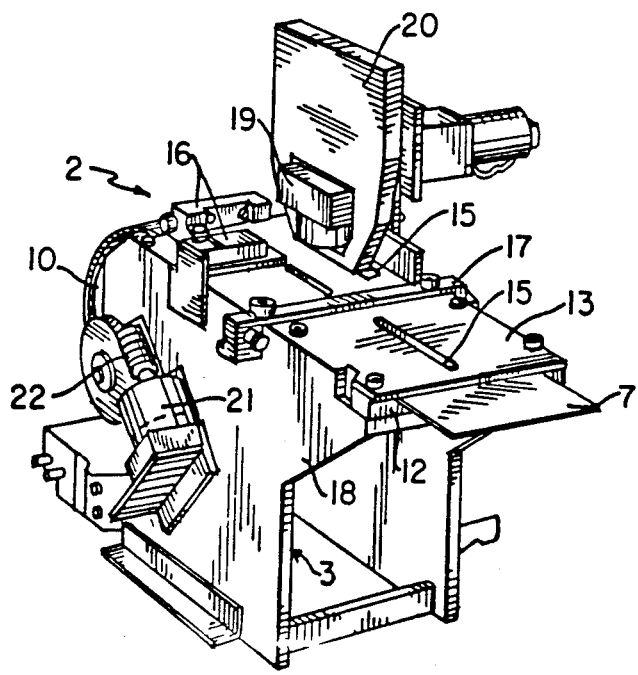
FIG. 3 is an isometric view of the dispensing head.

The sprocket drum 10 is adapted to push the tickets forwardly through a feed path defined by a lower support plate 12 and upper guide plate 13 which are spaced to form a slot 14 (see FIG. 3) through which the ticket is dispensed. The upper guide plate has an opening 15, where required, for access of the print head to the ticket surface, and both plates 12 and 13 are intercepted along their length by the presence of a guillotine 17. Both of the plates 12 and 13 as well as the guillotine 17 are carried by a chassis secured to the upper end of the pedestal 3.

A dot matrix type of electronic print head 19 is provided in the ticket dispense path and a co-operating cassette ribbon 20 is positioned suitably relative to the print head 19. This print head and cassette ribbon assembly is hingedly attached to the chassis so that it can be swung outwardly for the easy replacement of the cassette ribbon or, indeed, for replacement of the print head if required.

Forward movement of the sprocket drum 10 is achieved through a stepper motor 21 which drives the drum through a worm gear 22. The stepper motor and dot matrix print head as well as the guillotine are all controlled through the electronic control circuitry 5 which embodies a micro-processor 23 and an electronic real time clock 24 which offers full calendar and leap year calculation functions. Such electronic clocks offer totally satisfactory accuracies of the order of one minute per month. Also, the clock has a battery back-up power supply to ensure that proper time is kept during power failures and the like and that the clock does not have to be reset after the power has been off.

The micro-processor is activated, for the purpose of controlling the stepper motor, by an optical sensor 25 which co-operates with holes 26 through the end of the wall of the sprocket drum. There are, in this case, three of such holes 26, offset by 120° relative to each other. The arrangement is such that the sensor sends a signal to the micro-processor as a hole 26 passes it, during the feeding of a ticket through the dispenser. This signal activates an adjustable counter within the micro-processor which transmits a predetermined number of operating "steps" to the stepper motor to stop it when the drum has moved through a corresponding portion of a revolution after receipt of the signal from the sensor.

For the purposes of illustration, in one particular embodiment of the invention, each operating "step" corresponds to one hundredth of a revolution of the sprocket drum or 3,6° of rotation. There is provided a selector 27 for selecting from one to ten "steps" after the signal has been given by the sensor as the point at which the sprocket drum stops and this terminates the feeding of any particular ticket. Selection of the correct number of such "steps" enables the position of the relevant transverse perforated line 11 relative to the guillotine to be adjusted to ensure that there is sufficient distance between the line of cut at the end 11a of a ticket and the adjacent perforated line 11. The reason for requiring that such a distance is sufficient is that the guillotine, as mentioned in the preamble hereto, fails to operate properly if these two lines are too close together.

Initiation of the feeding of a ticket is triggered by any suitable means for providing the micro-processor with a suitable signal. Such means may be a loop detector 28 or even a push button.

The electronic control circuitry also includes two ticket presence optical sensors 29 and 30. The first one 29 detects the presence of a chain or tickets at the input side of the sprocket drum. The other or second 30 detects the presence, or rather the fact that a dispensed ticket has been removed from the output side of the feed path. The outputs from both of these sensors are fed to the micro-processor which prevents the further operation of the dispenser in the event that no chain of tickets is present at the input side to the sprocket drum, in the one case, and, until a dispensed ticket has been removed in the other case. The three optical sensors 25, 29 and 30 each have a LED (light emitting diode) associated therewith to indicate their condition.

Preferably there is provided an input keyboard 31 and an electronic time display 32 in the housing 25 for the electronic control circuitry. The input keyboard enables both the time and date of the time clock to be set, as and when required. The keyboard also enables additional identification information to be installed in the circuitry so that such additional information is printed onto a ticket as it is moved past the print head.

The latter information may be stored in an electrically erasable programmable read only memory unit so as to be retained regardless of the state of the incoming supply voltage or other non-volatile memory such as a battery backed up random access memory (RAM).

It will be understood that, in use, the time need be set on the time clock only very occasionally and any required additional information input through the keyboard 31.

When the dispenser is activated, the micro-processor will cause the stepper motor to drive the continuous chain of tickets through the feed path and the dot matrix printer will simultaneously print the time, date and additional information onto the leading ticket as it moves past the print head. At the end of the movement of one ticket, which is governed by the optical sensor 25 in combination with the selector 27 and micro-processor 23, the guillotine is activated and the ticket may be withdrawn by the person in the usual way.

Preferably the dispenser is also provided with a counter to count the total number of tickets issued.

It will be understood that, as indicated above, the circuitry is all included on individual plug-in type of circuit boards, and the individual units such as the guillotine, stepper motor, print head, sensors, keyboard and the like are all made to be easily replaced to thereby minimise the frequency and duration of service calls.

Many variations may be made to the above described embodiment of the invention without departing from the scope hereof. In particular different types of electronic print heads could be employed and the means of driving a sprocket drum could be varied accordingly. Also, such a ticket dispenser could include means for additionally recording the information on a magnetic stripe applied to the tickets to enable the tickets to be employed for automatically activating a reader in an automatic pay booth or, indeed, the dot matrix characters could be made to be of a readable format themselves.

The invention therefore provides a more reliable and more easily maintained automatic ticket dispenser than prior art similar dispensers.

What we claim is new and desire to secure by Letters Patent is:

1. An automatic ticket dispenser comprising ticket feed means including a rotatable sprocket drum co-operant with prepunched holes in a substantially continuous chain of tickets for dispensing tickets in a path, a print head assembly in the path of movement of tickets dispensed by the dispenser, a time clock, control circuitry connected to the time clock and print head, and a sensor co-operant with formations on the sprocket drum to control the ticket feed means through the control circuitry, the arrangement being operative to print required information concerning time, as reflected by the time clock, onto a leading ticket of a chain thereof as it is dispensed through the feed means by the sprocket drum, and wherein rotation of the sprocket drum is controlled by the control circuitry in co-operation with the sensor.

2. An automatic ticket dispenser as claimed in claim 1 in which the sprocket drum is operated by a stepper motor through a worm gear drive.

3. An automatic ticket dispenser as claimed in claim 2 in which the electronic circuitry is operative to terminate movement of the sprocket drum only after a predetermined movement of the drum has taken place subsequent to detection of a formation on the drum by the sensor.

4. An automatic ticket dispenser as claimed in claim 3 in which said predetermined movement of the sprocket drum is adjustable.

5. An automatic ticket dispenser as claimed in claim 4 in which the electronic circuitry controls the number of output "steps" to the stepper motor to control said predetermined movement.

6. An automatic ticket dispenser as claimed in claim 5 in which the electronic control circuitry includes a micro-processor.

7. An automatic ticket dispenser as claimed in claim 1 in which said formations on the sprocket drum are perforations or notches in the drum and the sensor is an optical sensor.

8. An automatic ticket dispenser as claimed in claim 1 in which the electronic print head is a dot matrix print head.

9. An automatic ticket dispenser as claimed in claim 1 in which the sprocket drum is located behind the print head in the said path of movement of tickets.

10. An automatic ticket dispenser as claimed in claim 1 in which the path of movement of tickets passes between a lower support plate and upper guide plate, said plates having necessary apertures therethrough for the print head to access a ticket to be printed.

11. An automatic ticket dispenser as claimed in claim 1 in which there is included a guillotine for separating individual tickets from a substantially continuous chain thereof.

12. An automatic ticket dispenser as claimed in claim 1 in which the electronic time clock has a battery tack-up power supply.

13. A ticket dispenser as claimed in claim 1 in which the electronic control circuitry includes input means whereby information other than time and date to be printed on a ticket can be varied.

* * * * *